(12) United States Patent
Kim et al.

(10) Patent No.: US 7,401,930 B2
(45) Date of Patent: Jul. 22, 2008

(54) PROJECTION SYSTEM

(75) Inventors: Sung-tae Kim, Seoul (KR); Jeong-ho Nho, Suwon-si (KR)

(73) Assignee: Samsung Electronics Co., Ltd., Suwon (KR)

( * ) Notice: Subject to any disclaimer, the term of this patent is extended or adjusted under 35 U.S.C. 154(b) by 192 days.

(21) Appl. No.: 11/151,298

(22) Filed: Jun. 14, 2005

(65) Prior Publication Data

US 2005/0275812 A1    Dec. 15, 2005

(30) Foreign Application Priority Data

Jun. 15, 2004    (KR)    ............ 10-2004-0044129

(51) Int. Cl.
G03B 21/28    (2006.01)

(52) U.S. Cl. ............... 353/98; 353/102

(58) Field of Classification Search ............ 353/98, 353/102, 69, 70, 99; 349/5, 7, 8; 348/742, 348/743, 771
See application file for complete search history.

(56) References Cited

U.S. PATENT DOCUMENTS

| 5,245,369 | A | | 9/1993 | Um et al. |
| 6,129,437 | A | * | 10/2000 | Koga et al. ............... 353/98 |
| 6,219,110 | B1 | | 4/2001 | Ishikawa et al. |
| 6,574,046 | B1 | | 6/2003 | Shioya |
| 6,683,657 | B1 | | 1/2004 | Miyawaki |
| 6,702,447 | B2 | * | 3/2004 | Wang ............... 353/98 |
| 6,801,362 | B1 | * | 10/2004 | Brown ............ 359/618 |
| 6,908,199 | B2 | * | 6/2005 | Cha ............... 353/98 |
| 7,055,959 | B2 | * | 6/2006 | Wada et al. .......... 353/77 |
| 7,066,609 | B2 | * | 6/2006 | Ishihara et al. ....... 353/99 |
| 2003/0133080 | A1 | * | 7/2003 | Ogawa et al. ....... 353/31 |
| 2005/0046810 | A1 | * | 3/2005 | Nakamura ........ 353/102 |
| 2006/0268245 | A1 | * | 11/2006 | Lin et al. ........... 353/102 |

FOREIGN PATENT DOCUMENTS

| JP | 2000-258703 A | 9/2000 |
| JP | 2001-109068 A | 4/2001 |
| JP | 2001-183603 A | 7/2001 |
| JP | 2001-337394 A | 12/2001 |
| KR | 94-18535 U | 7/1994 |
| KR | 1998-034590 A | 8/1998 |
| KR | 1998-085794 A | 12/1998 |
| KR | 2001-0045326 A | 6/2001 |

* cited by examiner

*Primary Examiner*—William C. Dowling
(74) *Attorney, Agent, or Firm*—Sughrue Mion, PLLC

(57) ABSTRACT

A projection system is provided. The projection system includes a light source, a color filter separating light emitted from the light source into colored light, a light-path converter converting a path of the colored light that has passed through the color filter, a lens having a positive refractive power in order to condense the light from the light-path converter, a display device processing the light that has passed through the lens in response to an input signal and forming a color image, and a projection lens unit enlarging and projecting the color image onto a screen.

9 Claims, 3 Drawing Sheets

PROJECTION SYSTEM

CROSS-REFERENCE TO RELATED PATENT APPLICATIONS

This application claims the benefit of Korean Patent Application No. 10-2004-0044129, filed on Jun. 15, 2004, in the Korean Intellectual Property Office, the disclosure of which is incorporated herein in its entirety by reference.

BACKGROUND OF THE INVENTION

1. Field of the Invention

The present invention relates to a projection system, and more particularly, to a downsized projection system having improved condensing efficiency and uniformity of illumination.

2. Description of the Related Art

A projection system is largely classified into a three-panel projection system and a single-panel projection system depending on the number of display devices the projection system contains. The display devices perform on-off control on light emitted from a light source, which is a high-power lamp in units of pixels, to form a color image. In the single-panel projection system, the structure of an optical system can be reduced in comparison to the three-panel projection system, but white light is separated into red (R), green (G), and blue (B) colors using a sequential method. Thus, the photoefficiency of the single-panel projection system is reduced to ⅓ the photoefficiency of the three-panel projection system. Thus, efforts for increasing photoefficiency of the single-panel projection system have been made.

In a conventional single-panel projection system, a beam irradiated from a white light source is separated into R, G, and B color beams such as R, G, and B colors, using a color filter, and each color beam is sequentially transferred to a display device. The display device is operated in the order of the colors so as to form an image.

Display devices include liquid crystal displays (LCDs) and deformable mirror devices (DMDs).

The DMD has advantages such as having excellent heat resistance, high resolution and being of low cost. However, in order to use the DMD, a beam should be nearly orthogonally incident on the DMD. Due to this limitation, the number of optical devices in the system increases, and luminance is lowered accordingly.

In order to solve these problems, efforts for reducing the number of optical devices in the system have been made.

A conventional image display apparatus is disclosed in U.S. Pat. No. 6,129,437, and FIG. 1 is a structural diagram of the image display apparatus disclosed therein.

Referring to FIG. 1, the conventional image display apparatus comprises a white light source 50 having an arc 51 and an elliptical mirror 52; a color filter 53 which separates light emitted from the white light source 50 according to each color; a condensing lens 1 through which the light that has passed through the color filter 53 passes; a reflection mirror 2 which reflects the light that has passed through the condensing lens 1; a display device 56 which modulates the light reflected by the reflection mirror 2 in response to an input image signal to form a color image; and a projection lens unit 57 which includes first through fourth lenses 571, 572, 573, and 574 which enlarge and project the color image onto a screen 58. Here, reference numeral 60 denotes a glass rod or a fly-eye integrator.

The reflection mirror 2 is a single mirror having a concave shape arranged on a light path other than the light path defined by optical devices 56 through 58. In addition, the reflection mirror 2 is arranged to be eccentric with respect to the optical axis defined by the condensing lens 1 and the white light source 50.

In the above structure, the reflection mirror 2 is used to direct the light emitted from the light source 50 onto the display device 56. However, since the concave mirror has to condense a highly divergent beam, photoefficiency and uniformity of illumination are lowered.

SUMMARY OF THE INVENTION

The present invention provides a projection system having a reflection mirror and a lens in which a beam is easily made incident on a display device at a desired angle and improves condensing efficiency and uniformity of illumination.

Consistent with an aspect of the present invention, there is provided a projection system including: a light source; a color filter separating light emitted from the light source into colored light; a light-path converter converting a path of colored light that has passed through the color filter; a lens having a positive refractive power in order to condense the light from the light-path converter; a display device processing the light that has passed through the lens in response to an input signal and forming a color image; and a projection lens unit enlarging and projecting the color image onto a screen.

Also, at least one surface of the lens may be aspherical. Further, the light-path converter may be a flat mirror or a concave mirror.

The lens may be arranged on a light path between the light-path converter and the display device so that only light reflected by the light-path converter passes through the lens.

BRIEF DESCRIPTION OF THE DRAWINGS

The above aspects and advantages of the present invention will become more apparent by describing in detail exemplary embodiments thereof with reference to the attached drawings in which.

DETAILED DESCRIPTION OF THE INVENTION

Figure 2A:
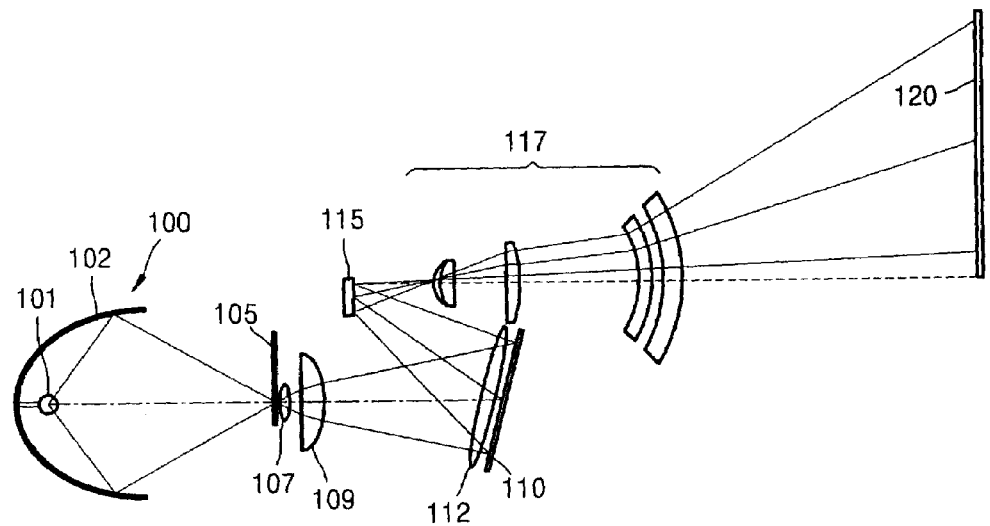
FIG. 2A is a schematic diagram of a projection system consistent with an exemplary embodiment of the present invention.

FIG. 2A is a schematic diagram of a projection system consistent with an exemplary embodiment of the present invention. The projection system of FIG. 2A includes a light source 100; a color filter 105 which separates light emitted from the light source 100 into colored light; a display device 115 which processes incident light in response to an input signal and forms a color image; and a projection lens unit 117 which enlarges and projects the color image onto a screen 120.

The light source 100 includes a lamp 101 which generates light; and a reflector 102 which reflects the light emitted from the lamp 101. The reflector 102 may be an elliptical mirror or a parabolic mirror. The reflector 102 may be an elliptical mirror which sets the position of the lamp 101 to one focus and sets a point where light is condensed to another focus. Alternatively, the reflector 102 may be a parabolic mirror which sets the position of the lamp 101 to one focus and makes light emitted from the lamp 101 and reflected by the reflector 102 parallel light.

A light-path converter 110 and a condensing lens 112 are disposed on a light path between the color filter 105 and the display device 115. The light-path converter 110 directs the light that has passed through the color filter 105 onto the display device 115. The condensing lens 112, having a positive refractive power, condenses light reflected by the light-path converter 110 onto a display device 115 at a predetermined angle.

A uniform light illumination unit 107 and a condensing lens 109 are disposed on a light path between the color filter 105 and the light-path converter 110. The uniform light illumination unit 107 makes light that has passed through the color filter uniform, and the condensing lens 109 condenses the light.

A glass rod, a fly-eye lens array or an integrator may be used as the uniform light illumination unit.

The light-path converter 110 may be a flat reflection mirror, a concave mirror, or a hologram device. FIG. 2A shows the case where the light-path converter 110 is a flat reflection mirror.

In addition, the lens 112 having the positive refractive power may be a spherical lens or an aspherical lens. The condensing lens 112 may be a dual-sided convex lens or an one-sided convex lens. FIG. 2A shows the case where the condensing lens 112 is a dual-sided convex lens. When the condensing lens 112 is an aspherical lens, both surfaces or only one surface of the condensing lens 112 may be aspherical.

Here, the optical axis ranging from the light source 100 to the light-path converter 110 may be parallel to the optical axis of the projection lens unit 117. The reflection angle of the light-path converter 110 is adjusted so that the light incident on the projection lens unit 117 is parallel to the optical axis of the light source 100.

The condensing lens 112, having the positive refractive power, is arranged adjacent to the front of the light-path converter 110 so that light reflected by the light-path converter 110 is condensed on the display device 115. Here, light that has passed through the color filter 105 passes through the condensing lens 112 and is incident on the light-path converter 110, and the light is then reflected by the light-path converter 110 through the condensing lens 112 again to be incident on the display device 115.

Figure 2B:
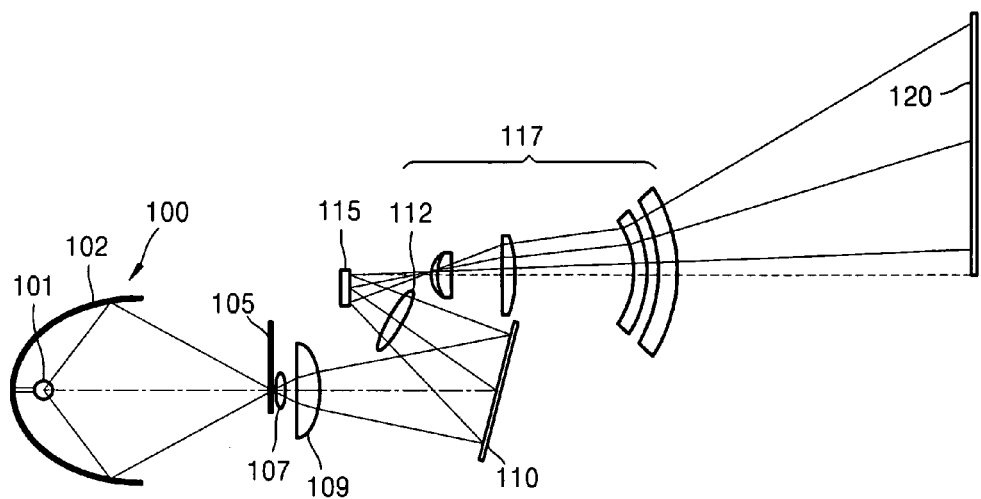
FIG. 2B is a schematic diagram where the position of a lens having a positive refractive power and which is shown in FIG. 2A, is changed.

In this way, the condensing lens 112 can be arranged so that both the light incident on the light-path converter 110 and the light reflected by the light-path converter 110 pass through the condensing lens 112. In contrast, as shown in FIG. 2B, the condensing lens 112 can be arranged so that only the light reflected by the light-path converter 110 passes through the condensing lens 112 once. As shown in FIG. 2B, when only the light reflected by the light-path converter 110 passes through the condensing lens 112 having the positive refractive power, the interference of light can be reduced.

Figure 3:
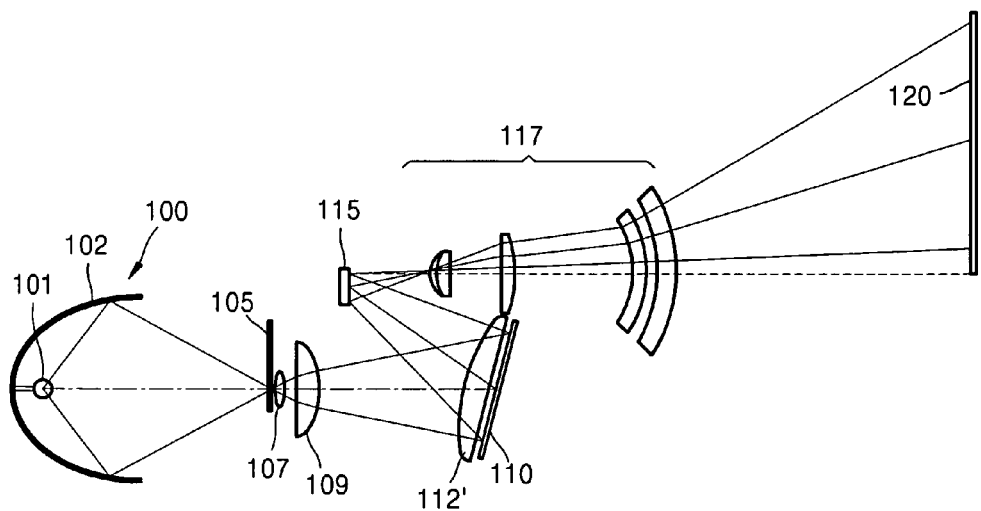
FIG. 3 is a schematic diagram of a modified example of the projection system consistent with an exemplary embodiment of the present invention.

FIG. 3 shows the case where a lens 112', having a positive refractive power, has one convex surface. In this case, the convex surface may be aspherical.

Figure 4:
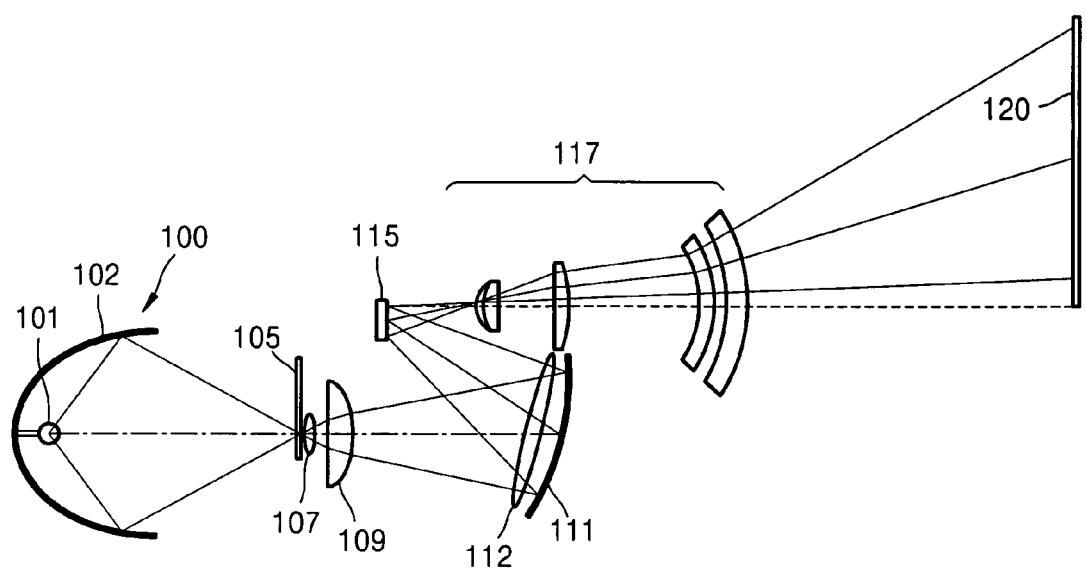
FIG. 4 is a schematic diagram of a projection system consistent with another exemplary embodiment of the present invention.

FIG. 4 is a schematic diagram of a projection system consistent with another exemplary embodiment of the present invention. The projection system of FIG. 4 is different from the projection system of FIG. 2A in that the light-path converter is the concave mirror 111 instead of a flat mirror, and the other elements of FIG. 4 may be the same as those of FIG. 2A. Detailed descriptions of like elements having the same reference numerals have been omitted.

When the concave mirror 111 is used as the light-path converter, the refractive power of the lens 112 can be reduced in comparison to the lens of the flat mirror projection system.

In the projection system consistent with an exemplary embodiment of the present invention, light-path converters 110 or 111 and lenses 112 or 112' having a positive refractive power are provided so that light emitted from a light source is incident on the display device 115 at a predetermined angle.

The operation of the projection system consistent with an exemplary embodiment of the present invention will now be described.

In the projection system consistent with an exemplary embodiment the present invention, as shown in FIG. 2A, white light emitted from the light source 100 is sequentially filtered by the color filter 105 in the order of, for example, red light (R), green light (G), and blue light (B). The filtered light is made uniform by the uniform light illumination unit 107, and has a cross-sectional shape such as the shape of the display device 115. A condensing lens 109 condenses the light onto the light-path converter 110.

Figure 1:
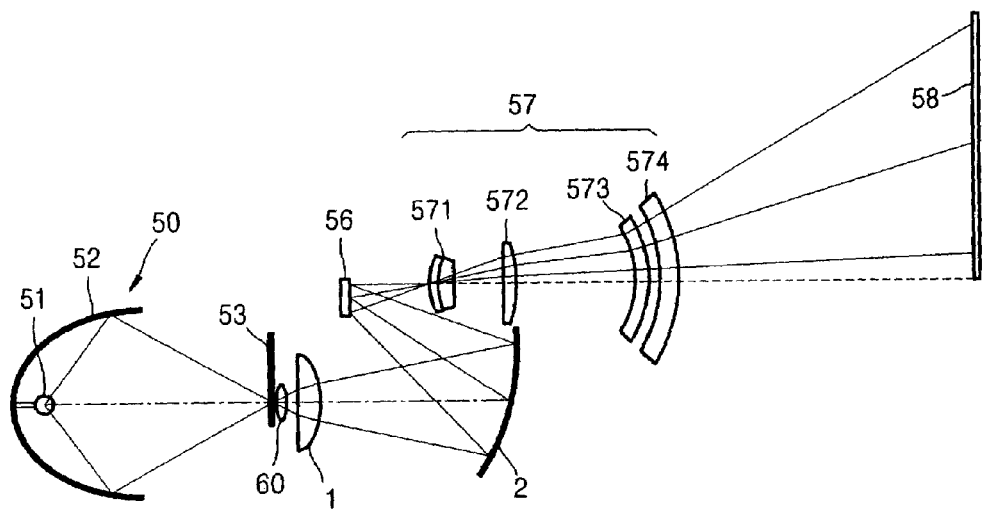
FIG. 1 is a structural diagram of an image display apparatus disclosed in U.S. Pat. No. 6,129,437.

The light reflected by the light-path converter 110 is condensed by the lens 112. The light reflected by the light-path converter 110 (a mirror), is again condensed by the lens 112. As a result, relative to the exemplary embodiment shown in FIG. 1, photoefficiency and beam uniformity is increased.

In addition, as with a conventional image display apparatus, in the case of using the concave mirror, aberration occurs. However, consistent with an exemplary embodiment the present invention, since the lens is used together with the light-path converter 110, problems such as aberration, condensing efficiency, and decreased uniformity of light can be easily resolved.

Furthermore, when at least one surface of the lens 112, having the positive refractive power, is aspherical, the condensing efficiency and uniformity of light can be effectively improved.

By using the light-path converter 110 and the lens 112 together, light can be made incident on the display device 115 at a desired angle. The display device 115 performs on-off control on each pixel in response to an image signal and forms a color image. The color image is enlarged and projected onto the screen 120 by the projection lens unit 117.

The mirror is provided to direct the path of light emitted from a light source, and the light reflected by the mirror is condensed using the lens with a positive refractive power such that the condensing efficiency and uniformity of light are improved.

A further advantage of the present invention is that the number of optical elements is reduced and as a result, the projection system is downsized.

Also, optical problems such as spherical aberration, photoefficiency, and decreased uniformity of light are easily and effectively resolved.

The present invention is easily applied to a front type projector having an offset structure of an illumination system of the projection system.

While the present invention has been particularly shown and described with reference to exemplary embodiments thereof, it will be understood by those skilled in the art that various changes in form and details may be made therein without departing from the spirit and scope of the invention as defined by the following claims.

What is claimed is:

1. A projection system comprising:
   a light source;
   a color filter separating light emitted from the light source into colored light;
   a light-path converter converting a path of colored light that has passed through the color filter;
   a lens having a positive refractive power in order to condense the light from the light-path converter;
   a display device processing the light that has passed through the lens in response to an input signal and forming a color image; and
   a projection lens unit enlarging and projecting the color image onto a screen;
   wherein the lens is arranged on a light path between the light-path converter and the display device so that light incident on the light-path converter and light reflected by the light-path converter pass through the lens; and
   wherein the light-path converter is a flat mirror.

2. The projection system of claim 1, wherein at least one surface of the lens is aspherical.

3. The projection system of claim 2, wherein an optical axis of the light source is parallel to an optical axis of the projection lens unit.

4. The projection system of claim 1, wherein at least one surface of the lens is spherical.

5. The projection system of claim 1, wherein at least one surface of the lens is a convex surface.

6. The projection system of claim 1, wherein a uniform light illumination unit making light that has passed through the color filter uniform and a condensing lens are disposed on a light path between the color filter and the light-path converter.

7. The projection system of claim 1, wherein an optical axis of the light source is parallel to an optical axis of the projection lens unit.

8. A projection system comprising:
   a light source;
   a color filter separating light emitted from the light source into colored light;
   a light-path converter converting a path of colored light that has passed through the color filter;
   a lens having a positive refractive power in order to condense the light from the light-path converter;
   a display device processing the light that has passed through the lens in response to an input signal and forming a color image; and
   a projection lens unit enlarging and projecting the color image onto a screen;
   wherein at least one surface of the lens is aspherical, and
   wherein the lens is arranged on a light path between the light-path converter and the display device so that light incident on the light-path converter and light reflected by the light-path converter pass through the lens; and
   wherein the light-path converter is a flat mirror.

9. A projection system comprising:
   a light source;
   a color filter separating light emitted from the light source into colored light;
   a light-path converter converting a path of colored light that has passed through the color filter;
   a lens having a positive refractive power in order to condense the light from the light-path converter;
   a display device processing the light that has passed through the lens in response to an input signal and forming a color image;
   a projection lens unit enlarging and projecting the color image onto a screen; and
   wherein the lens is arranged on a light path between the light-path converter and the display device so that only light reflected by the light-path converter passes through the lens; and
   wherein the light-path converter is a flat mirror.

* * * * *